US012719180B2

(12) United States Patent
Miki et al.

(10) Patent No.: US 12,719,180 B2
(45) Date of Patent: Aug. 25, 2026

(54) ANTENNA MODULE AND VEHICLE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Yutaro Miki, Osaka (JP); Suguru Yamagishi, Osaka (JP); Ichiro Kuwayama, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/725,825

(22) PCT Filed: Oct. 20, 2022

(86) PCT No.: PCT/JP2022/039126
§ 371 (c)(1),
(2) Date: Jul. 1, 2024

(87) PCT Pub. No.: WO2023/132113
PCT Pub. Date: Jul. 13, 2023

(65) Prior Publication Data

US 2025/0105528 A1 Mar. 27, 2025

(30) Foreign Application Priority Data

Jan. 6, 2022 (JP) ................................ 2022-001041

(51) Int. Cl.
*H01Q 21/08* (2006.01)
*H01Q 1/32* (2006.01)
(Continued)

(52) U.S. Cl.
CPC ........... *H01Q 21/08* (2013.01); *H01Q 1/3275* (2013.01); *H01Q 9/0407* (2013.01); *H01Q 15/006* (2013.01); *H01Q 21/205* (2013.01)

(58) Field of Classification Search
CPC .......... H01Q 1/32; H01Q 1/38; H01Q 21/065; H01Q 21/08; H01Q 15/006–0086
See application file for complete search history.

(56) References Cited

U.S. PATENT DOCUMENTS 6,262,495 B1 7/2001 Yablonovitch et al.
6,456,242 B1 * 9/2002 Crawford .............. H01Q 21/28 343/702
(Continued)

FOREIGN PATENT DOCUMENTS

JP 2002-510886 A 4/2002
JP 2007243375 A 9/2007
(Continued)

*Primary Examiner* — Hasan Islam
(74) *Attorney, Agent, or Firm* — XSENSUS LLP

(57) ABSTRACT

An antenna module includes: an antenna mounted to a mount surface; and an artificial magnetic conductor having a plate shape and arranged so as to be adjacent to the antenna, the artificial magnetic conductor having a first surface on which a plurality of first unit cells are regularly arrayed. The artificial magnetic conductor has a base end adjacent to the antenna, and the first surface extends from the base end along the mount surface.

11 Claims, 13 Drawing Sheets

(51) Int. Cl.

| | |
|---|---|
| ***H01Q 9/04*** | (2006.01) |
| ***H01Q 15/00*** | (2006.01) |
| ***H01Q 21/20*** | (2006.01) |

(56) References Cited

U.S. PATENT DOCUMENTS

| | | | | |
|---|---|---|---|---|
| 9,692,132 | B2 * | 6/2017 | Kawaguchi | H01Q 1/32 |
| 10,014,572 | B2 * | 7/2018 | Tagi | H01Q 1/525 |
| 10,868,362 | B2 * | 12/2020 | Yun | H01Q 21/065 |
| 10,985,455 | B2 * | 4/2021 | Keyrouz | H01Q 1/521 |
| 11,121,461 | B2 * | 9/2021 | Sakai | H01Q 15/24 |
| 11,133,574 | B2 * | 9/2021 | Mizunuma | H01Q 25/00 |
| 2009/0015499 | A1 | 1/2009 | Kuroda | |
| 2018/0138591 | A1 | 5/2018 | Kim et al. | |
| 2019/0051977 | A1 | 2/2019 | Kawaguchi et al. | |
| 2022/0006178 | A1 | 1/2022 | Shimura et al. | |
| 2022/0173524 | A1 | 6/2022 | Miki et al. | |
| 2023/0238708 | A1 * | 7/2023 | Takahashi | H01P 1/00 343/702 |

FOREIGN PATENT DOCUMENTS

| | | | |
|---|---|---|---|
| JP | 2009-017515 | A | 1/2009 |
| JP | 2017152850 | A | 8/2017 |
| WO | 2020084841 | A1 | 4/2020 |
| WO | 2020/189033 | A1 | 9/2020 |

* cited by examiner

ANTENNA MODULE AND VEHICLE

CROSS-REFERENCE TO RELATED APPLICATIONS

This application is a national stage application, filed under 35 U.S.C. § 371, of International Patent Application No. PCT/JP2022/039126, filed Oct. 20, 2022, which claims priority from Japanese Patent Application No. 2022-001041, filed Jan. 6, 2022, the entire contents of each are incorporated herein by reference.

TECHNICAL FIELD

The present disclosure relates to an antenna module and a vehicle.

BACKGROUND ART

PATENT LITERATURE 1 discloses an antenna, for a mobile communication system, that is mounted to a mobile body such as a vehicle.

CITATION LIST

Patent Literature

PATENT LITERATURE 1: International Publication No. WO2020-189033

SUMMARY OF THE INVENTION (1) An antenna module as an embodiment includes: an antenna mounted to a mount surface; and an artificial magnetic conductor having a plate shape and arranged so as to be adjacent to the antenna, the artificial magnetic conductor having a first surface on which a plurality of first unit cells are regularly arrayed. The artificial magnetic conductor has a base end adjacent to the antenna, and the first surface extends from the base end along the mount surface.

(9) A vehicle as an embodiment from another viewpoint includes: a vehicle body; an antenna mounted to an upper surface of the vehicle body; and an artificial magnetic conductor having a plate shape and mounted to the upper surface so as to be adjacent to the antenna, the artificial magnetic conductor having a first surface on which a plurality of first unit cells are regularly arrayed. The artificial magnetic conductor has a base end adjacent to the antenna, and the first surface extends from the base end along the upper surface.

DETAILED DESCRIPTION

Problems to be Solved by the Present Disclosure

The above antenna may be mounted on the roof of a vehicle. The antenna mounted on the roof receives a radio wave from a base station therearound, and radiates a radio wave toward the base station.

At this time, in the directivity pattern of a vertically polarized wave, partial drop may occur in the direction of a relatively low elevation.

Base stations are installed at heights of 10 m or more. Therefore, the antenna mounted to a vehicle needs to radiate a radio wave to an elevation range of several degrees to about 60 degrees. Therefore, partial drop, in the directivity pattern, that occurs in the direction of a relatively low elevation may lead to decrease in the communication sensitivity with the base station.

Therefore, such partial drop in the directivity pattern of the vertically polarized wave needs to be suppressed as much as possible.

Effects of the Present Disclosure

According to the present disclosure, partial drop in the directivity pattern of the vertically polarized wave can be suppressed.

Description of Embodiments of the Present Disclosure

First, contents of the embodiments will be listed and described.

[Outline of Embodiments]

The above-described partial drop in the directivity pattern of the vertically polarized wave is considered to be caused by influence of the roof of the vehicle.

Figure 13:
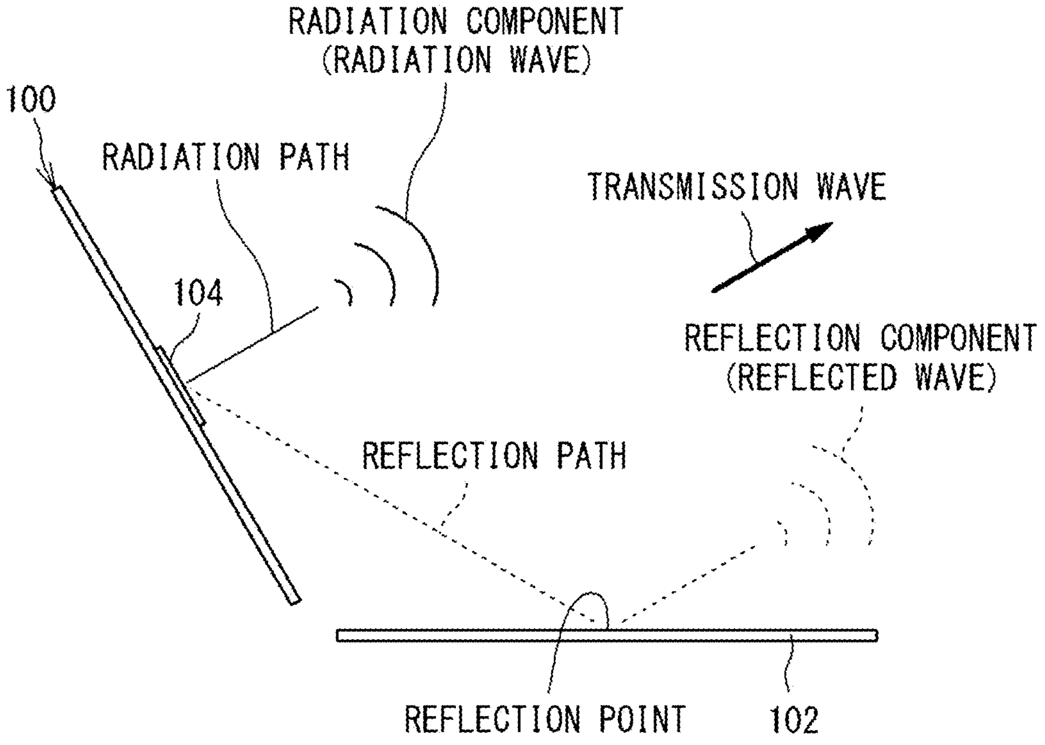
FIG. 13 is a diagram for describing a relationship between an antenna and a roof.

FIG. 13 is a diagram for describing a relationship between an antenna and a roof.

In FIG. 13, an antenna 100 is mounted on a roof 102. The antenna 100 has a patch antenna element 104. The patch antenna element 104 is installed diagonally upward at a predetermined elevation.

In a case where the roof 102 is formed from a conductive material such as a steel plate, when a radio wave is radiated from the patch antenna element 104, a component (radiation wave) due to the radiation path, and in addition, a component (reflected wave) due to the reflection path are caused. The radio wave (transmission wave) radiated into a space and received by the base station turns into a component (combined wave) in which the radiation wave and the reflected wave are combined.

Here, the phase of the reflected wave is inverted at the reflection point in the reflection path.

The radiation wave and the reflected wave in the transmission wave of the patch antenna element 104 are, depending on the radiation angle thereof, in opposite phases with each other due to the path length difference between the radiation path and the reflection path and the phase inversion described above, whereby the radiation wave and the reflected wave may cancel each other.

As a result, it is conceivable that partial attenuation occurs in a direction of a specific elevation, causing occurrence of partial drop in the directivity pattern of the vertically polarized wave of the antenna 100.

(1) In contrast, an antenna module as an embodiment includes: an antenna mounted to a mount surface; and an artificial magnetic conductor having a plate shape and arranged so as to be adjacent to the antenna, the artificial magnetic conductor having a first surface on which a plurality of first unit cells are regularly arrayed. The artificial magnetic conductor has a base end adjacent to the antenna, and the first surface extends from the base end along the mount surface.

The artificial magnetic conductor has reflection characteristics as a perfect magnetic conductor with respect to an incident wave within a specific frequency band. That is, if the frequency of a radio wave radiated from the antenna is within the specific frequency band, the phase of the reflected wave that occurs when the radio wave radiated from the antenna is reflected by the first surface of the artificial magnetic conductor is not inverted. That is, phase inversion at the reflection point in the reflection path is suppressed.

Therefore, according to the above configuration, through the provision of the artificial magnetic conductor so as to be adjacent to the antenna, the radiation wave and the reflected wave due to the reflection path having a reflection point at a point adjacent to the antenna are suppressed from being in opposite phases. As a result, partial attenuation of the radio wave radiated from the antenna is suppressed, and partial drop occurring in the directivity pattern of the vertically polarized wave at the antenna can be suppressed.

(2) In the antenna module (1) above, when the artificial magnetic conductor includes: a first ground conductor layer; and a first dielectric layer present between the plurality of first unit cells and the first ground conductor layer, an electrical length between a boundary between the plurality of first unit cells and the first dielectric layer, and a boundary between the first ground conductor layer and the first dielectric layer is preferably 0.03 or greater.

In this case, the plurality of first unit cells can be made smaller without changing the specific frequency band in which the artificial magnetic conductor has the reflection characteristics as a perfect magnetic conductor, and the plurality of first unit cells can be arranged at a higher density.

(3) In the antenna module of (1) or (2) above, when the artificial magnetic conductor has an outer end on a side opposite to the base end, and the first surface extends from the base end to the outer end, a ratio of a distance from the base end to the outer end relative to a vacuum wavelength of a radio wave radiated from the antenna is preferably 1 or greater.

In this case, the distance from the base end to the outer end can be equal to or greater than one wavelength of the radio wave radiated from the antenna. Accordingly, with respect to the reflection point in the reflection path when the radio wave is radiated from the antenna, the range of the artificial magnetic conductor can be appropriately set, and partial drop occurring in the directivity pattern of the vertically polarized wave can be more effectively suppressed.

(4) In the antenna module of (1) or (2) above, when the artificial magnetic conductor has an outer end on a side opposite to the base end, and the first surface extends from the base end to the outer end, a distance from the base end to the outer end is preferably 10.7 mm or more.

In this case as well, with respect to the reflection point in the reflection path when the radio wave is radiated from the antenna, the range of the artificial magnetic conductor can be appropriately set, and partial drop occurring in the directivity pattern of the vertically polarized wave can be more effectively suppressed.

(5) In the antenna module of any one of (1) to (4) above, in a case where the antenna includes one or a plurality of patch antenna elements, when the first surface is viewed in a plan view, an imaginary perpendicular line extending from a radiation surface of the one or the plurality of patch antenna elements preferably passes the first surface.

In this case, the artificial magnetic conductor can be arranged at a position corresponding to the radiation direction of the radio wave radiated by the one or the plurality of patch antenna elements. Thus, the position of the artificial magnetic conductor can be appropriately set with respect to the reflection point in the reflection path. Therefore, partial drop occurring in the directivity pattern of the vertically polarized wave in the radiation direction can be suppressed.

(6) In the antenna module (5) above, the antenna may further include: a second ground conductor layer; a second dielectric layer present between the one or the plurality of patch antenna elements and the second ground conductor layer; and an electromagnetic band gap structure provided so as to surround a periphery of the one or the plurality of patch antenna elements.

In this case, when the shielding band of the electromagnetic band gap structure is configured to include the frequency of the radio wave radiated from the antenna, partial drop occurring in the directivity pattern of the vertically polarized wave can be further effectively suppressed.

(7) In the antenna module of any one of (1) to (6) above, a frequency of a radio wave transmitted and received by the antenna is preferably 20 GHz or higher.

In this case, the effect of suppressing phase inversion at the reflection point due to the artificial magnetic conductor can be effectively obtained.

(8) In the antenna module of any one of (1) to (7) above, the mount surface may be a roof surface of a vehicle.

In general, the roof of a vehicle is formed from a conductive material such as a steel plate. Therefore, when the artificial magnetic conductor is provided so as to cover the roof, phase inversion at the reflection point in the reflection path can be appropriately suppressed. As a result, partial attenuation of the radio wave radiated from the antenna is suppressed, whereby partial drop occurring in the directivity pattern of the vertically polarized wave at the antenna can be suppressed.

(9) A vehicle as an embodiment from another viewpoint includes: a vehicle body; an antenna mounted to an upper surface of the vehicle body; and an artificial magnetic conductor having a plate shape and mounted to the upper surface so as to be adjacent to the antenna, the artificial magnetic conductor having a first surface on which a plurality of first unit cells are regularly arrayed. The artificial magnetic conductor has a base end adjacent to the antenna, and the first surface extends from the base end along the upper surface.

In the configuration above as well, partial drop occurring in the directivity pattern of the vertically polarized wave at the antenna can be suppressed.

(10) In the vehicle of (9) above, the artificial magnetic conductor may be a body separate from the antenna.

In this case as well, partial drop occurring in the directivity pattern of the vertically polarized wave at the antenna can be suppressed.

Details of Embodiments

Hereinafter, preferable embodiments will be described with reference to the drawings.

At least some parts of the embodiments described below may be combined as desired.

First Embodiment

Figure 1:
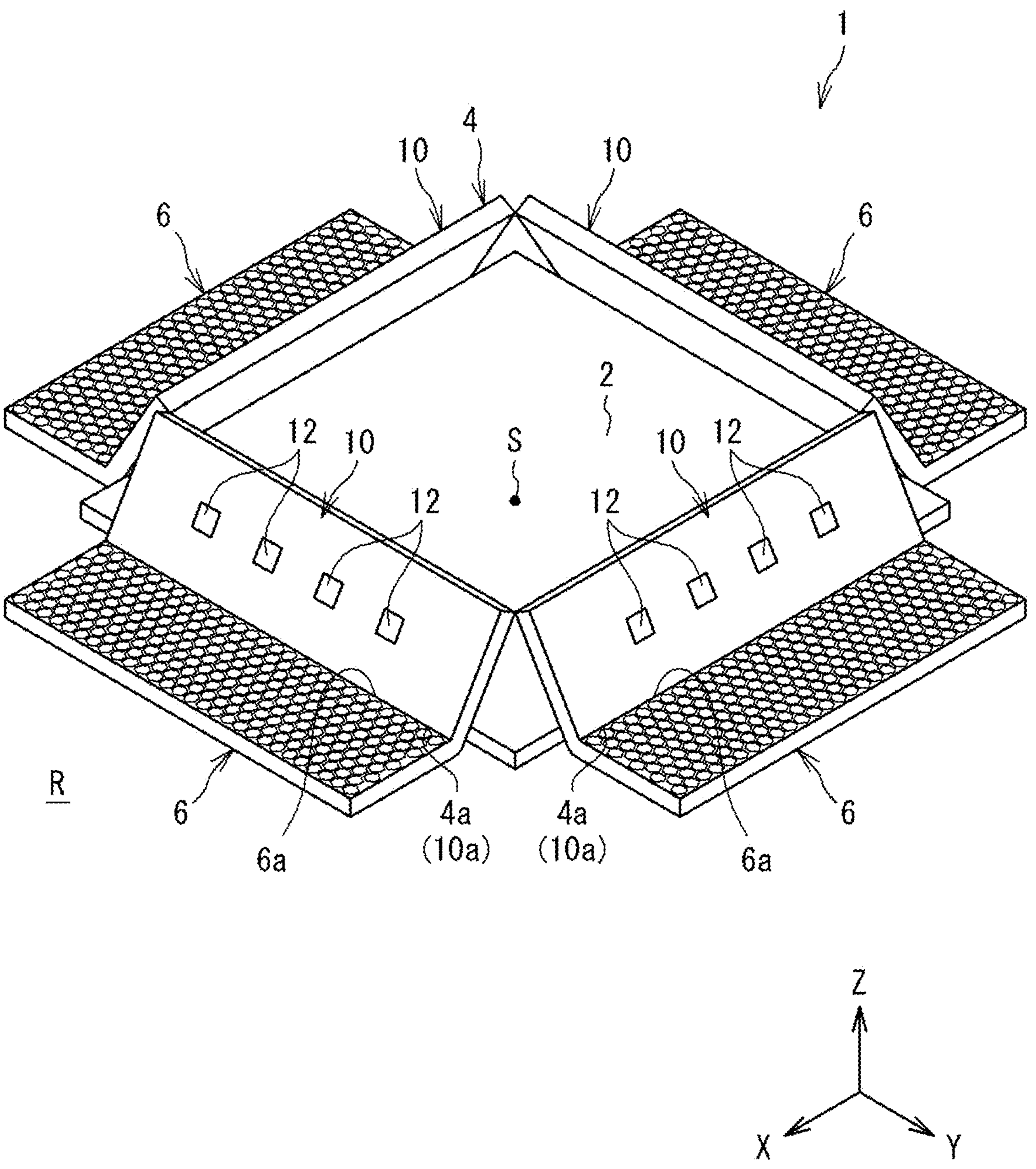
FIG. 1 is a perspective view showing an example of an antenna module according to a first embodiment.

FIG. 1 is a perspective view showing an example of an antenna module according to a first embodiment.

An antenna module 1 is an antenna module used in a mobile terminal according to the 5th-generation mobile communication system, for example.

In FIG. 1, out of an X-direction, a Y-direction, and a Z-direction orthogonal to each other, the Z-direction is a direction parallel to the vertical direction. Therefore, an X-Y plane is a horizontal plane.

The antenna module 1 is used while being mounted to the upper surface of a vehicle (vehicle body). The upper surface of the vehicle includes the trunk upper surface, the hood upper surface, and the like, in addition to the roof surface (ceiling surface).

FIG. 1 shows the antenna module 1 in a state of being mounted to a roof surface R of a vehicle.

The antenna module 1 has a function of transmitting and receiving a radio wave from a base station outside the vehicle. The antenna module 1 is used so as to allow a communication device mounted to the vehicle and a mobile terminal inside the vehicle to be connected to and communicate with a base station.

The vehicle to which the antenna module 1 is mounted includes a passenger car, a bus, a railway vehicle, and the like.

The antenna module 1 includes a base substrate 2, an antenna 4, and a plurality of artificial magnetic conductors 6.

The base substrate 2 is a rectangular substrate mounted to the roof surface R of the vehicle, and has the antenna 4 and the plurality of artificial magnetic conductors 6 mounted thereto. The base substrate 2 is a mounting member for mounting the antenna 4 so as to stand on the roof surface R of the vehicle.

The antenna 4 is provided so as to stand on the roof surface R serving as a mount surface. The antenna 4 includes a plurality of (four in the illustrated example) antenna substrates 10. The four antenna substrates 10 each have a plurality of (four in the illustrated example) patch antenna elements 12. The four antenna substrates 10 are fixed to, so as to stand on, the base substrate 2 along the four sides of the base substrate 2. The four antenna substrates 10 are each provided such that each of the four patch antenna elements 12 faces the outer side.

The outer side denotes the direction away from a center S of the base substrate 2, and the inner side denotes the direction approaching the center S of the base substrate 2.

The four patch antenna elements 12 of each of the four antenna substrates 10 are arranged at an equal interval along the horizontal direction. The four patch antenna elements 12 form an array antenna. Therefore, each antenna substrate 10 can realize beam forming in the horizontal direction toward the outer side. For example, each antenna substrate 10 can change the orientation of the beam in a range of about 100 degrees in the azimuth direction. The respective antenna substrates 10 share the beam forming in four equal parts along the entire circumference in the azimuth direction thereof. Accordingly, the antenna 4 can direct the beam to the entire circumference in the azimuth direction.

Each antenna substrate 10 is inclined with respect to the base substrate 2 such that the front direction of the plurality of patch antenna elements 12 faces diagonally upward.

The azimuth direction denotes the rotation direction about an axis parallel to the Z-direction (the vertical direction).

In the 5th-generation mobile communication system, a radio wave having a frequency band of 3 to 10 GHz, a submillimeter wave having a frequency band of 27 to 30 GHz, or a millimeter wave having a frequency band equal to or higher than that, is used.

More specifically, the frequency of the radio wave radiated from each antenna substrate 10 is preferably 3 GHz or higher, more preferably 5 GHz or higher, and further preferably 20 GHz or higher.

The upper limit of the frequency of the radio wave radiated from the antenna substrate 10 is not limited in particular, and is, for example, 300 GHz, preferably 200 GHz, more preferably 100 GHz, and further preferably 50 GHz.

The plurality of (four in the illustrated example) artificial magnetic conductors 6 are each a member having a rectangular plate shape. The four artificial magnetic conductors 6 are provided along the four sides of the base substrate 2. Therefore, the four artificial magnetic conductors 6 are provided over the periphery of the antenna 4 from a base end **4*a* of the antenna 4. The four artificial magnetic conductors 6 are arranged so as to be adjacent to the antenna 4**.

The four artificial magnetic conductors 6 extend in directions away from the antenna 4. More specifically, the four artificial magnetic conductors 6 extend toward the outer side from base ends **10*a* of the four antenna substrates 10. The base ends 10*a* of the antenna substrates 10 form the base end 4*a* of the antenna 4**.

Base ends **6*a* of the four artificial magnetic conductors 6 and the base ends 10*a* of the four antenna substrates 10 are connected to each other. Therefore, the four artificial magnetic conductors 6 and the four antenna substrates 10 are provided integrally with each other. The four artificial magnetic conductors 6 and the four antenna substrates 10** may be integrated with each other, or may be separated from each other.

The four artificial magnetic conductors 6 are mounted to the roof surface R. The four artificial magnetic conductors 6 are provided so as to cover the periphery of the antenna 4 at the roof surface R. More specifically, the four artificial magnetic conductors 6 are provided so as to cover the outer side with respect to the base ends **10*a* of the four antenna substrates 10**.

As described later, the four artificial magnetic conductors 6 extend, from the antenna 4, along the radiation direction of the antenna 4.

The base end 4*a* of the antenna 4 denotes the root portion of the standing antenna 4 when the antenna 4 is provided so as to stand up against the roof surface R serving as the installation surface or a plane facing the same direction that the roof surface R faces. More specifically, the base end 4*a* of the antenna 4 denotes the portion where the root portion of each antenna substrate 10 when the antenna substrate 10 stands up against the upper surface of the artificial magnetic conductor 6 or the roof surface R, or a plane along the radiation surface of each patch antenna element 12 of the antenna substrate 10 crosses the upper surface of the artificial magnetic conductor 6 or the roof surface R.

The four artificial magnetic conductors 6 (hereinafter, also referred to as AMCs 6) are each a member formed as a so-called meta-material. The meta-material is a structure in which a plurality of components are regularly arrayed, and is a structure that has electromagnetic properties that cannot be realized by conventional materials.

The AMC 6 has reflection characteristics as a perfect magnetic conductor with respect to a radio wave incident on the AMC 6 from a space.

When the frequency of an incident wave is within a specific frequency band, the AMC 6 substantially has reflection characteristics as a perfect magnetic conductor.

Therefore, when a radio wave within the specific frequency band is incident on the AMC 6, the phase of the incident wave and the phase of the reflected wave become approximately the same phase.

Hereinafter, in the present specification, the specific frequency band denotes the frequency band of the incident wave at which the AMC 6 substantially functions as a perfect magnetic conductor.

Although each AMC 6 shown in FIG. 1 is exposed to the outside, the AMC 6 may be covered by a cover formed from a resin or the like. In this case, the AMC 6 is protected from the external environment.

Figure 2:
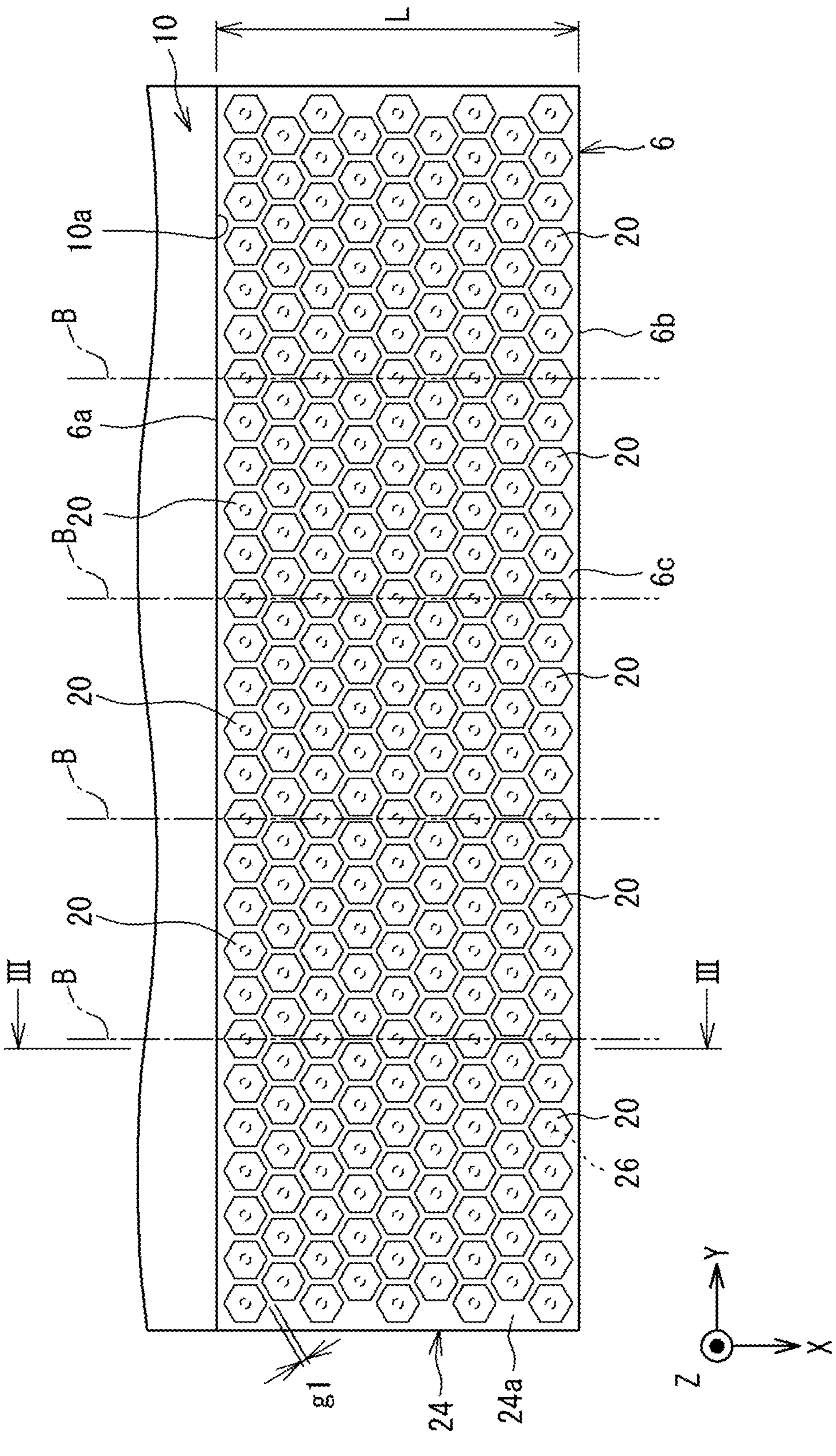
FIG. 2 is a plan view of an artificial magnetic conductor.
Figure 3:
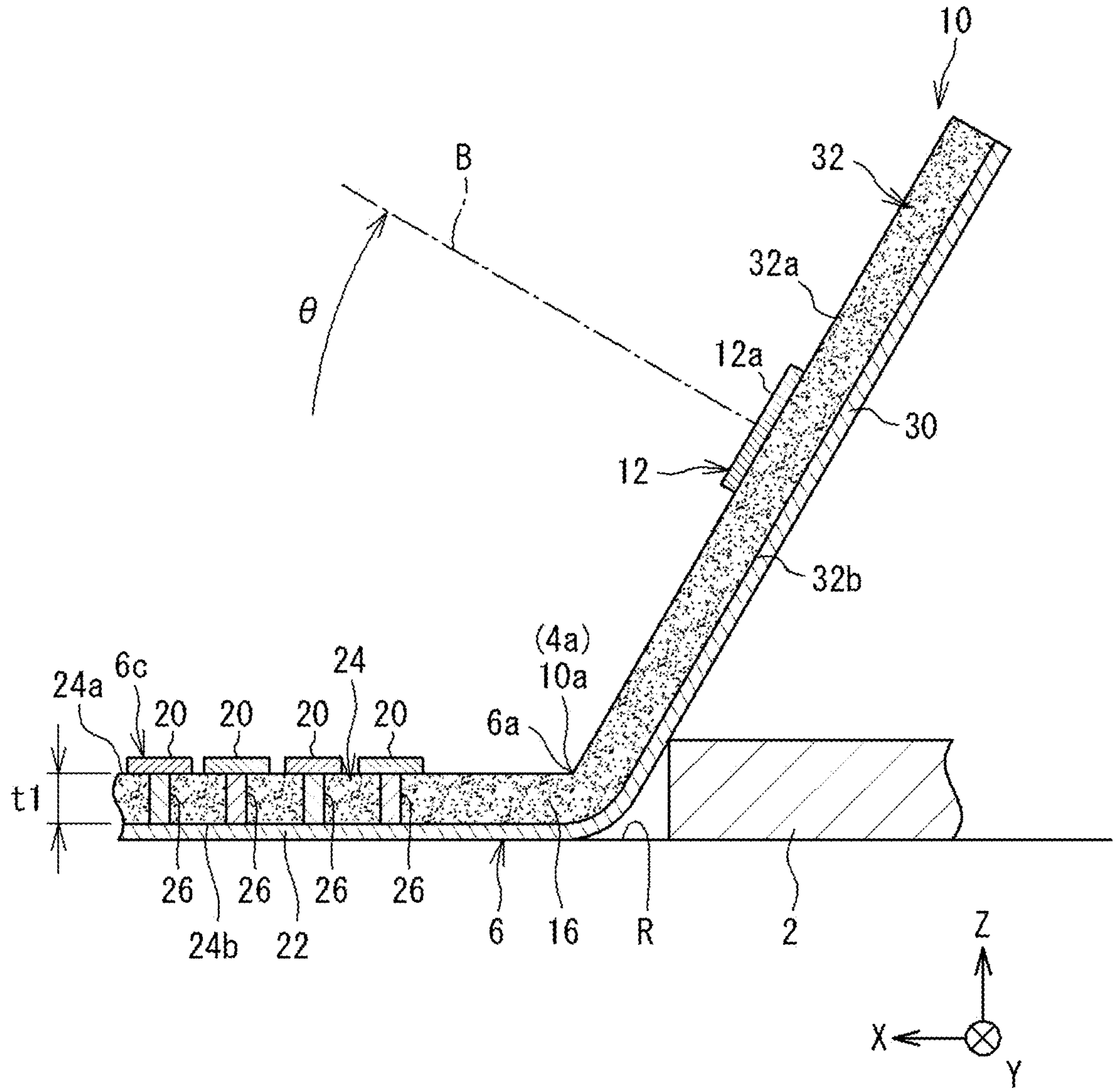
FIG. 3 is a cross-sectional view taken along arrows III-III in FIG. 2.

FIG. 2 is a plan view of the AMC 6, and FIG. 3 is a cross-sectional view taken along arrows III-III in FIG. 2. FIG. 3 also shows a cross section of the antenna substrate 10 in addition to the cross section of the AMC 6.

As shown in FIG. 2 and FIG. 3, the AMC 6 includes a plurality of first unit cells 20, a first ground conductor layer 22, a first dielectric layer 24, and a plurality of first vias 26.

The first dielectric layer 24 is present between the plurality of first unit cells 20 and the first ground conductor layer 22. The first dielectric layer 24 is a dielectric substrate having a rectangular shape. The plurality of first unit cells 20 are provided on an upper surface 24*a* of the first dielectric layer 24. The first ground conductor layer 22 is provided on a lower surface 24*b* of the first dielectric layer 24.

The first ground conductor layer 22 is a plate-shaped member composed of a conductor such as copper. The first ground conductor layer 22 is provided over approximately the entire region of the lower surface 24*b*.

The plurality of first unit cells 20 are each a plate-shaped member composed of a conductor such as copper. The outer shape of each first unit cell 20 is a hexagon viewed in the Z-direction.

As shown in FIG. 2, the plurality of first unit cells 20 are regularly arrayed on the upper surface 24*a*. The plurality of first unit cells 20 are arrayed with a gap g1 therebetween. The gap g1 is preferably uniform.

The plurality of first unit cells 20 are provided over the entire region of the upper surface 24*a*. Therefore, a first surface 6*c* of the AMC 6 is configured to include the upper surface 24*a* of the first dielectric layer 24, and the plurality of first unit cells 20. That is, the plurality of first unit cells 20 are regularly arrayed on the first surface 6*c*. The AMC 6 is arranged on the roof surface R. Therefore, the first surface 6*c* is a surface that faces the upper direction which is the same direction that the roof surface R faces. The first surface 6*c* extends along the roof surface R, from the base end 6*a* (the base end 10*a* of the antenna substrate 10) of the artificial magnetic conductor 6.

Being regularly arrayed denotes that the positional relationship and the gap of the plurality of first unit cells 20 have regularity, and denotes a state where the plurality of first unit cells 20 are arranged in alignment with a certain gap therebetween as described above.

The AMC 6 has the above-described base end 6*a* and an outer edge 6*b* (outer end). The base end 6*a* is a side or an edge adjacent to the antenna 4 (antenna substrate 10). The outer edge 6*b* is an edge (or a side) on the side opposite to the base end 6*a*.

The base end 6*a* is connected to the base end 10*a* of the antenna substrate 10 as described above.

The first surface 6*c* extends from the base end 6*a* to the outer edge 6*b* of the AMC 6.

That the base end 6*a* is adjacent to the antenna 4 includes not only a case where the base end 6*a* is connected, in direct contact, to the antenna substrate 10, but also a case where the base end 6*a* is connected via a bent portion 16 to the antenna substrate 10 as described later, and a case where the base end 6*a* is arranged so as to be close, although not directly or indirectly connected, to the antenna substrate 10 in a range in which the base end 6*a* can be connected to the antenna substrate 10 by means of the bent portion 16 or the like.

The outer shape of the first unit cell 20 is preferably a regular hexagon, but may be a square or may be another polygon. When the outer shape of the first unit cell 20 is a regular hexagon, the first unit cells 20 can be arrayed at a higher density than in the case of a square. Further, the outer shape of the first unit cell 20 may include a curve portion or uneven shapes.

The plurality of first vias 26 are each a columnar member composed of a conductor such as copper. Each of the plurality of first vias 26 connects a first unit cell 20 and the first ground conductor layer 22. Thus, the first via 26 penetrates the portion between the upper surface 24*a* and the lower surface 24*b* of the first dielectric layer 24. The first via 26 may be provided as a through-hole.

As in FIG. 2 and FIG. 3, the structure having a plurality of first unit cells 20 and a plurality of first vias 26 is referred to as a mushroom structure.

As described above, the AMC 6 functions as a perfect magnetic conductor when the frequency of the incident wave incident on the first surface 6*c* is within the specific frequency band. Therefore, in this case, if the frequency of the radio wave radiated from the antenna substrate 10 (the antenna 4) is within the specific frequency band, the phase of the reflected wave that occurs when the radio wave radiated from the patch antenna element 12 is reflected by the artificial magnetic conductor is not inverted.

Therefore, the specific frequency band of the AMC 6 of the present embodiment is set so as to include the frequency of the radio wave radiated from the antenna substrate 10.

As shown in FIG. 3, the antenna substrate 10 includes a second ground conductor layer 30 and a second dielectric layer 32 in addition to the four patch antenna elements 12.

The second dielectric layer 32 is present between the four patch antenna elements 12 and the second ground conductor layer 30. The second dielectric layer 32 is a dielectric substrate having a rectangular shape. The four patch antenna elements 12 are provided on a second surface 32*a* of the second dielectric layer 32. The second ground conductor layer 30 is provided on a third surface 32*b* of the second dielectric layer 32. The third surface 32*b* is the opposite surface of the second surface 32*a*.

The second ground conductor layer 30 is a plate-shaped member composed of a conductor such as copper. The second ground conductor layer 30 is provided over approximately the entire region of the third surface 32*b*.

Each patch antenna element 12 is a plate-shaped member composed of a conductor such as copper. That is, the patch antenna element 12 is a planar antenna element.

The patch antenna element 12 has a feeding point (not shown) for horizontal polarization and a feeding point (not shown) for vertical polarization. To both feeding points, for example, a signal is provided from outside through a via (not shown) penetrating the second dielectric layer 32 and the second ground conductor layer 30.

When a signal is provided to the feeding point for vertical polarization, the patch antenna element 12 radiates a radio wave having vertical polarization. When a signal is provided to the feeding point for horizontal polarization, the patch antenna element 12 radiates a radio wave having horizontal polarization.

As described above, each antenna substrate 10 is provided to the base substrate 2 in a state of being inclined with respect to the Z-direction such that each patch antenna element 12 faces diagonally upward.

An imaginary perpendicular line B extending from a radiation surface 12*a* of the patch antenna element 12 passes above the AMC 6. Each of the imaginary perpendicular lines B extending from the radiation surfaces of the four patch antenna elements 12 passes above the AMC 6. That is, as shown in FIG. 2, when the first surface 6*c* of the AMC 6 is viewed in a plan view, the imaginary perpendicular lines B pass the first surface 6*c*. Each imaginary perpendicular line B indicates the radiation direction of the radio wave radiated from the corresponding radiation surface 12*a*. Thus, the AMC 6 extends along the radiation direction of the patch antenna element 12.

As shown in FIG. 3, the imaginary perpendicular line B extending in the radiation direction from the radiation surface 12*a* of the patch antenna element 12 is inclined by an angle θ with respect to a horizontal plane. That is, the angle θ indicates the elevation (the angle with respect to the horizontal plane) in the radiation direction of the patch antenna element 12.

The antenna module 1 of the present embodiment is assumed to perform transmission and reception of a radio wave to and from a base station for which the elevation is in a range of 3 to 60 degrees. Therefore, the angle θ is preferably 15 degrees or more and 50 degrees or less, and more preferably 25 degrees or more and 35 degrees or less.

The angle θ at the patch antenna element 12 of the present embodiment is 30 degrees, for example.

The antenna substrate 10 and the AMC 6 are connected to each other via the bent portion 16.

The bent portion 16 connects the base end 10*a* of the antenna substrate 10 and the base end 6*a* of the artificial magnetic conductor 6.

In the present embodiment, one dielectric substrate having a ground conductor layer formed thereon is bent, whereby the first dielectric layer 24, the first ground conductor layer 22, the second dielectric layer 32, and the second ground conductor layer 30 are formed. Therefore, the first dielectric layer 24 and the second dielectric layer 32 are continuous with each other. In addition, the first ground conductor layer 22 and the second ground conductor layer 30 are continuous with each other.

The artificial magnetic conductor 6 and the antenna substrate 10 can be formed by using a rigid substrate or a flexible substrate. When the artificial magnetic conductor 6 and the antenna substrate 10 are formed integrally with each other by using a flexible substrate, flexibility of the artificial magnetic conductor 6 and the antenna substrate 10 can be enhanced. In addition, forming the bent portion 16 becomes easy.

The first dielectric layer 24 and the second dielectric layer 32 are formed by using polyimide, liquid crystal polymer, PPE resin, fluorocarbon resin, or the like.

Here, when a radio wave is radiated from the patch antenna element 12 of the antenna substrate 10, a component (radiation wave) due to the radiation path, and in addition, a component (reflected wave) due to the reflection path are caused, as described above. The radio wave radiated into a space and received by the base station turns into a component (combined wave) in which the radiation wave and the reflected wave are combined.

The phase of the reflected wave is inverted at the reflection point in the reflection path. Therefore, the radiation wave in the transmission wave radiated from the patch antenna element 12 and the reflected wave may cancel each other.

As a result, partial attenuation occurs in a direction of a specific elevation, causing occurrence of partial drop in the directivity pattern of the vertically polarized wave at the antenna substrate 10.

In the present embodiment, as described above, the phase of the reflected wave that occurs when the radio wave radiated from the antenna substrate 10 is reflected by the first surface 6*c* of the AMC 6 is not inverted. That is, phase inversion at the reflection point in the reflection path is suppressed.

Therefore, according to the above configuration, through the provision of the AMC 6 so as to be adjacent to and around the antenna 4, the radiation wave and the reflected wave due to the reflection path having a reflection point at a point in the periphery of the antenna 4 are suppressed from being in opposite phases. As a result, partial attenuation of the radio wave (transmission wave) radiated from the antenna substrate 10 is suppressed, and partial drop occurring in the directivity pattern of the vertically polarized wave at the antenna substrate 10 can be suppressed.

In the present embodiment, as described above, when the first surface 6*c* of the AMC 6 is viewed in a plan view, the imaginary perpendicular line B extending in the radiation direction from the radiation surface 12*a* of the patch antenna element 12 passes the first surface 6*c* of the AMC 6.

Therefore, the AMC 6 can be arranged at a position corresponding to the radiation direction of the radio wave radiated by the patch antenna element 12. Thus, the position of the AMC 6 can be appropriately set with respect to the reflection point in the reflection path. Therefore, partial drop occurring in the directivity pattern of the vertically polarized wave in the radiation direction can be suppressed.

Here, it is preferable to appropriately set the dimension from the base end 6*a* to the outer edge 6*b* of the AMC 6 such that the position of the reflection point in the reflection path when a radio wave is radiated from the antenna substrate 10 is included in the range of the AMC. The outer edge 6*b* of the AMC 6 is also the outer edge of the first surface 6*c*.

In FIG. 2, a ratio P of a distance L from the base end 6*a* (the base end 10*a* of the antenna substrate 10) of the AMC

6 to the outer edge 6*b* of the AMC 6 (the first surface 6*c*) relative to a vacuum wavelength 20 is preferably 1 or greater.

In this case, the distance L from the base end 6*a* to the outer edge 6*b* can be equal to or greater than one wavelength of the radio wave radiated from the antenna substrate 10. Accordingly, with respect to the reflection point in the reflection path when the radio wave is radiated from the antenna substrate 10, the range of the AMC 6 can be appropriately set, and partial drop occurring in the directivity pattern of the vertically polarized wave at the patch antenna element 12 can be more effectively suppressed.

The ratio P is more preferably 1.5 or greater, and further preferably 1.8 or greater.

Accordingly, partial drop occurring in the directivity of the patch antenna element 12 can be further effectively suppressed.

The ratio P is represented by formula (1) below.

$$\text{The ratio } P = \text{the distance } L/\lambda 0 \tag{1}$$

The distance L is the distance from the base end 6*a* (the base end 10*a* of the antenna substrate 10) of the AMC 6 to the outer edge 6*b* of the AMC 6. The vacuum wavelength λ0 is determined in accordance with the wavelength of the radio wave radiated from the antenna substrate 10 (the antenna 4).

For example, when the frequency of the radio wave radiated from the antenna substrate 10 is 28 GHz, the vacuum wavelength 20 is 10.7 mm, and when the distance Lis 10.7 mm, the ratio P becomes 1.

Therefore, when the frequency of the radio wave radiated from the antenna substrate 10 is 28 GHz, the distance L is preferably 10.7 mm or more.

When the frequency of the radio wave radiated from the antenna substrate 10 is 28 GHz, the distance L is more preferably 16 mm or more and further preferably 19 mm or more.

The upper limit value of the ratio P is not limited in particular, and is preferably 20 or less and more preferably 10 or less, for example. When the frequency of the radio wave radiated from the antenna substrate 10 is 28 GHz, the upper limit value of the distance L is preferably 214 mm or less and more preferably 107 mm or less.

A thickness t1 of the first dielectric layer 24, that is, the electrical length between the boundary between the plurality of first unit cells 20 and the first dielectric layer 24, and the boundary between the first ground conductor layer 22 and the first dielectric layer 24, is preferably 0.03 or greater.

In this case, the plurality of first unit cells 20 can be made smaller without changing the specific frequency band of the AMC 6, and the plurality of first unit cells 20 can be arranged at a higher density.

The lower limit value of the electrical length between the plurality of first unit cells 20 and the first ground conductor layer 22 is preferably 0.05, more preferably 0.1, and further preferably 0.15.

The upper limit value of the electrical length between the plurality of first unit cells 20 and the first ground conductor layer 22 is preferably 1, more preferably 0.7, further preferably 0.5, further preferably 0.3, and further preferably 0.2.

The electrical length is preferably selected in a range equal to or lower than one upper limit selected from the plurality of upper limit values described above and equal to or higher than one lower limit value selected from the plurality of lower limit values described above.

Here, the electrical length is defined by the thickness (physical length) t1 of the first dielectric layer 24, the vacuum wavelength 20, and a relative dielectric constant εr.

The electrical length is represented by formula (2) below.

$$\text{the electrical length} = (t1/\lambda 0) \times (\varepsilon r)^{1/2} \tag{2}$$

For example, when the frequency of the radio wave radiated from the antenna substrate 10 is 28 GHz, the vacuum wavelength 20 is 10.7 mm, and when the thickness t1 of the first dielectric layer 24 is 0.5 mm and the relative dielectric constant εr of the first dielectric layer 24 is 3.7, the electrical length between the plurality of first unit cells 20 and the first ground conductor layer 22 becomes 0.899. In this case, the electrical length becomes 0.03 or greater.

Thus, when the frequency of the radio wave radiated from the antenna substrate 10 is 28 GHz and the relative dielectric constant εr of the first dielectric layer 24 is 3.7, it is preferable that the thickness t1 of the first dielectric layer 24 is 0.17 mm or more. In this case, the electrical length becomes 0.03 or greater.

The specific frequency band is determined by the structure of the AMC 6. The length (the diameter of the circumcircle) of the diagonal line of the first unit cell 20, the gap g1, the diameter of the first via 26, and the like are adjusted as appropriate, in consideration of the thickness t1 of the first dielectric layer 24 and the relative dielectric constant, such that the specific frequency band includes the frequency of the radio wave radiated from the antenna substrate 10.

Second Embodiment

Figure 4:
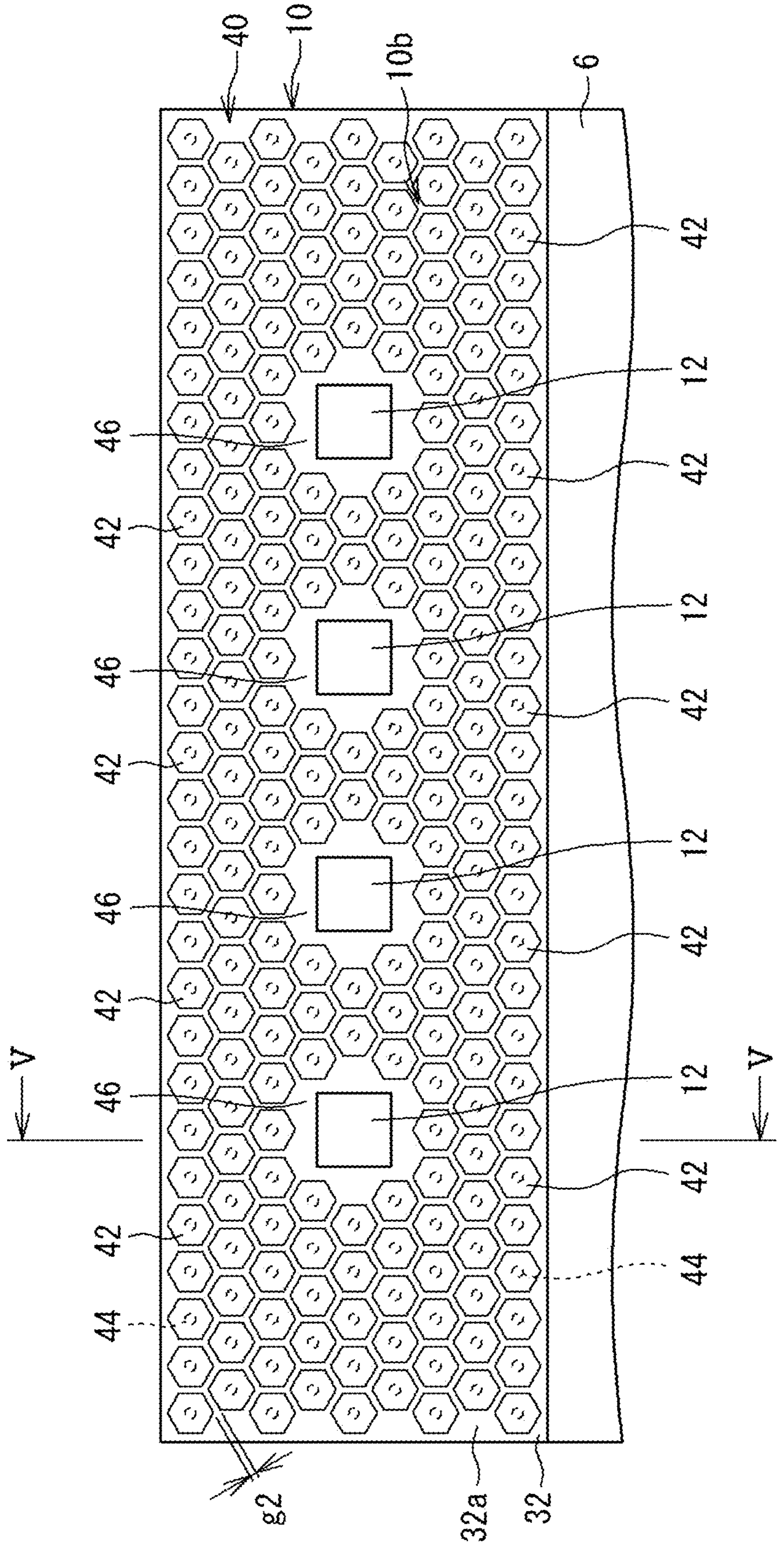
FIG. 4 shows an antenna substrate according to a second embodiment.
Figure 5:
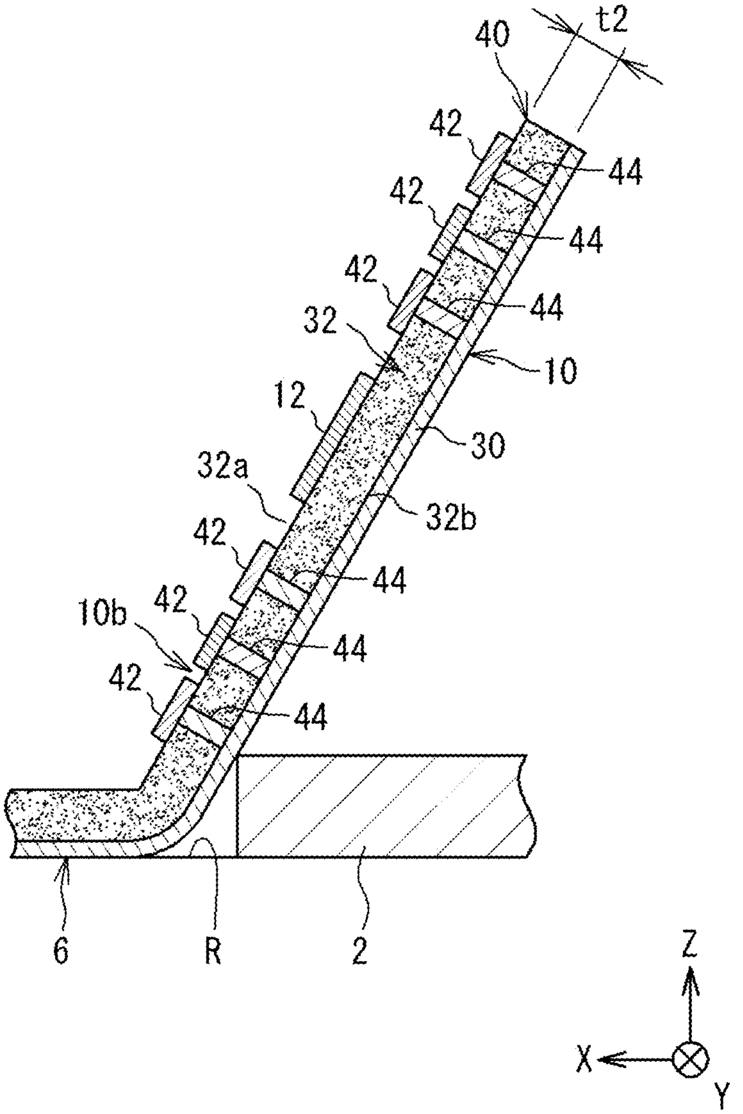
FIG. 5 is a cross-sectional view taken along arrows V-V in FIG. 4.

FIG. 4 shows the antenna substrate 10 according to a second embodiment, and FIG. 5 is a cross-sectional view taken along arrows V-V in FIG. 4.

The antenna module 1 of the present embodiment is different from that of the first embodiment in that the antenna substrate 10 is provided with an electromagnetic band gap structure 40.

In FIG. 4 and FIG. 5 the electromagnetic band gap structure 40 is provided so as to surround the periphery of the four patch antenna elements 12.

The electromagnetic band gap structure 40 (hereinafter, also referred to as an EBG structure 40) includes a plurality of second unit cells 42 and a plurality of second vias 44.

The plurality of second unit cells 42 are provided on the second surface 32*a* of the second dielectric layer 32. The plurality of second unit cells 42 are each a plate-shaped member composed of a conductor such as copper. The outer shape of each second unit cell 42 is a hexagon viewed from the front thereof.

As shown in FIG. 4, the plurality of second unit cells 42 are regularly arrayed on the second surface 32*a*. The plurality of second unit cells 42 are arrayed with a gap g2 therebetween. The gap g2 is preferably uniform.

The outer shape of the second unit cell 42 is preferably a regular hexagon, but may be a square or may be another polygon. When the outer shape of the second unit cell 42 is a regular hexagon, the second unit cells 42 can be arrayed at a higher density than in the case of a square. Further, the outer shape of the second unit cell 42 may include a curve portion or uneven shapes.

The plurality of second vias 44 are each a columnar member composed of a conductor such as copper. Each of the plurality of second vias 44 connects a second unit cell 42 and the second ground conductor layer 30. Thus, the second via 44 penetrates the portion between the second surface 32*a* and the third surface 32*b* of the second dielectric layer 32. The plurality of second vias 44 may each be provided as a through-hole.

Similar to the AMC 6, this EBG structure 40 also has a mushroom structure.

The EBG structure 40 has a characteristic of shielding a radio wave in a certain frequency band. That is, the EBG structure 40 has a frequency band (shielding band) in which a radio wave can be shielded.

The shielding band of the EBG structure 40 of the present embodiment is set so as to include the frequency of the radio wave radiated from the antenna substrate 10.

Therefore, the specific frequency band of the AMC 6 and the shielding band of the EBG structure 40 both include the frequency of the radio wave radiated from the antenna substrate 10.

On an antenna surface 10*b* of the antenna substrate 10, non-arrangement regions 46 of the plurality of second unit cells 42 are provided.

Each non-arrangement region 46 denotes a region provided by not arranging any second unit cell 42 in the place, in the antenna surface 10*b*, where the second unit cells 42 should be arranged. The non-arrangement regions 46 in FIG. 4 are provided by not arranging seven unit cells 42. Therefore, in the antenna surface 10*b*, the non-arrangement regions 46 are outside the arrangement range of the EBG structure 40.

The four patch antenna elements 12 are arranged in the non-arrangement regions 46. Thus, the EBG structure 40 surrounds the entire circumference of each of the four patch antenna elements 12. As a result, the EBG structure 40 is provided between the four patch antenna elements 12.

In a planar antenna such as a patch antenna, a surface wave mode occurs. The surface wave mode is a mode in which the radio wave radiated from the patch antenna element 12 propagates at the ground.

In the present embodiment, since the shielding band of the EBG structure 40 includes the frequency of the radio wave radiated from the antenna 4, the EBG structure 40 suppresses propagation of the surface wave radiated from the four patch antenna elements 12.

Since the antenna substrate 10 has the EBG structure 40, partial drop occurring in the directivity pattern of the vertically polarized wave at the patch antenna element 12 can be more effectively suppressed.

A thickness t2 of the second dielectric layer 32, that is, the electrical length between the plurality of second unit cells 42 and the second ground conductor layer 30 is preferably 0.03 or greater.

In this case, the plurality of second unit cells 42 can be made smaller without changing the shielding band of the EBG structure 40, and the plurality of second unit cells 42 can be arranged at a higher density.

[Other Modifications]

Figure 6A:
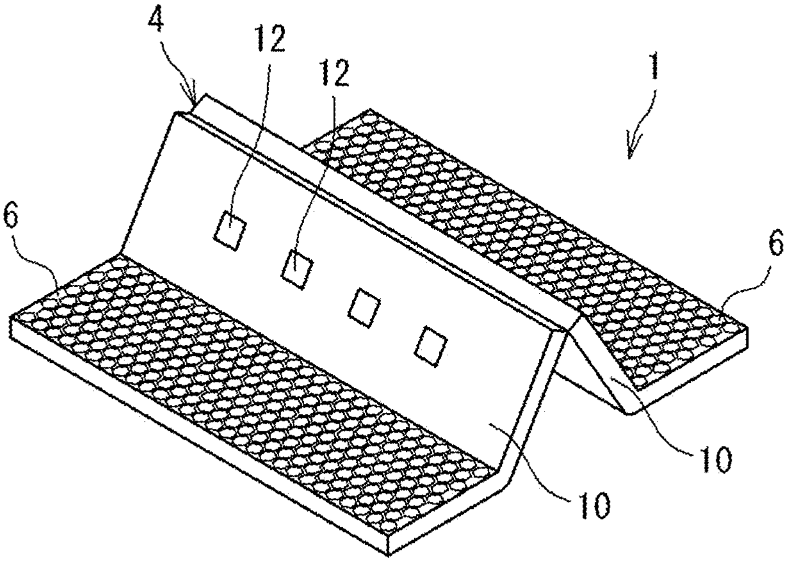
FIG. 6A is a perspective view showing an antenna module according to a modification.

In each embodiment above, an example case of using four AMCs 6 each having a rectangular plate shape has been shown. However, for example, as shown in FIG. 6A, when the antenna module 1 includes two antenna substrates 10, if the AMCs 6 are provided in a part of the periphery of the antenna 4 so as to correspond to the antenna substrates 10 (the patch antenna elements 12), the AMCs 6 need not necessarily be provided over the entire circumference of the periphery of the antenna 4.

Figure 6B:
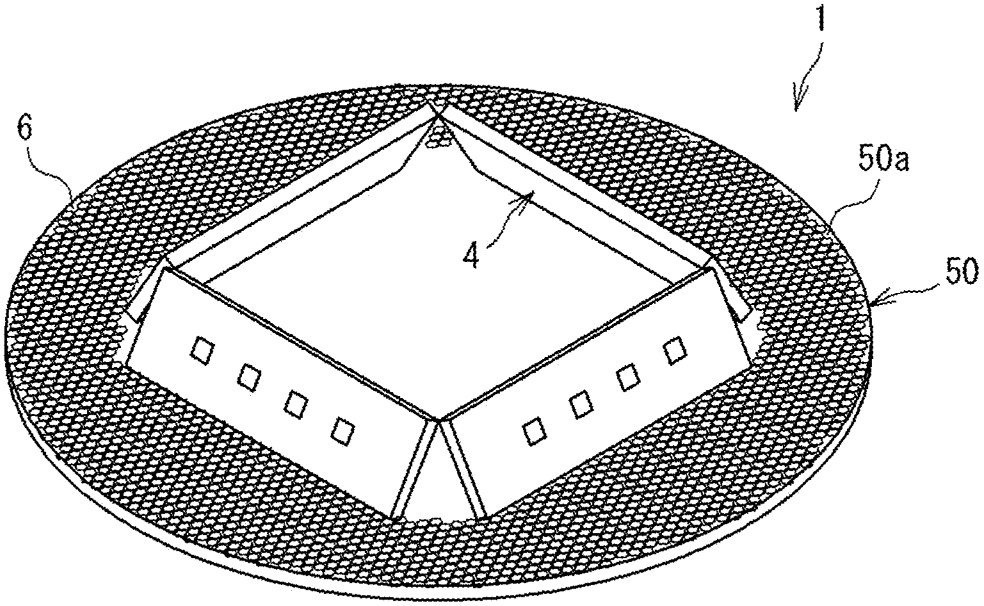
FIG. 6B is a perspective view showing an antenna module according to another modification.

Alternatively, as shown in FIG. 6B, the antenna 4 may be provided on an upper surface 50*a* of a substrate 50 having a disc shape, and one AMC 6 may be provided to the periphery of the antenna 4 on the upper surface 50*a*.

In each embodiment above, an example case where the AMC 6 includes the plurality of first unit cells 20, the first ground conductor layer 22, the first dielectric layer 24, and the plurality of first vias 26 has been shown. However, the AMC 6 may have a configuration in which, without provision of the plurality of first vias 26, the plurality of first unit cells 20 are regularly arrayed on the first dielectric layer 24.

Further, in each embodiment above, an example case where the plurality of patch antenna elements 12 are provided to each antenna substrate 10 has been shown. However, it is sufficient that at least one patch antenna element 12 is provided to each antenna substrate 10.

In each embodiment above, a case where the antenna 4 includes four antenna substrates 10 has been shown. However, for example, five or more antenna substrates 10 may be arranged so as to be oriented toward the outer side. It is sufficient that the antenna 4 includes at least one antenna substrate 10.

In each embodiment above, a case where the antenna 4 includes the patch antenna element 12 which is a planar antenna (patch antenna) has been shown. However, for example, the antenna 4 may include another type of antenna, such as a dipole.

Further, the antenna 4 may be a columnar antenna.

In each embodiment above, an example case where the antenna substrate 10 and the AMC 6 are connected to each other by means of the bent portion 16 has been shown. However, the antenna substrate 10 and the AMC 6 may be configured to be separated from each other.

In this case, without causing the AMC 6 and the antenna 4 to be included in one module, the AMC 6 can be configured as a body separate from the antenna 4.

In this case, the vehicle includes the antenna 4 mounted to the roof surface R, and the AMC 6 mounted to the roof surface R so as to be adjacent to the antenna 4. The AMC 6 is configured as a body separate from the antenna 4, without forming a module with the antenna 4.

[Verification Test]

Next, a verification test performed with respect to the effects of the AMC will be described.

As the test method, a model of the patch antenna element and the AMC was constructed, and using the model, the directivity pattern of the vertically polarized wave and the directivity pattern of the horizontally polarized wave when a radio wave was radiated from the patch antenna element were obtained through simulation by a computer.

Through comparison of the obtained directivity patterns, verification of the effects of the AMC was performed.

Figure 7A:
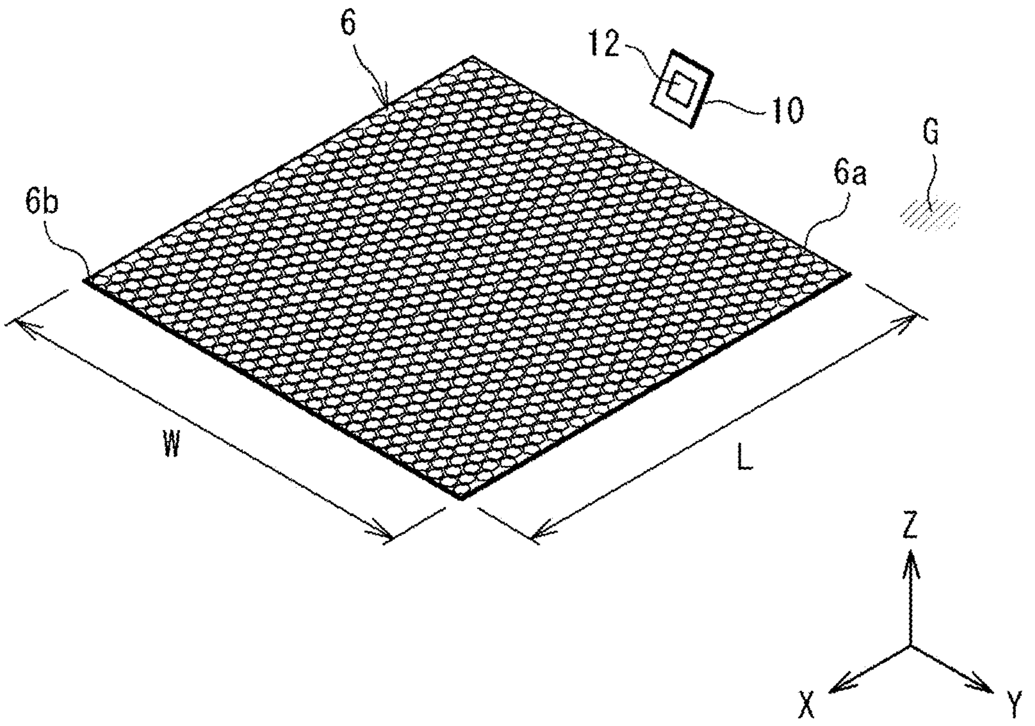
FIG. 7A is a perspective view showing a model used in a verification test.

FIG. 7A is a perspective view showing the model used in the verification test.

As the model of the verification test, an antenna substrate 10 including one patch antenna element 12 and one AMC 6 were used, and the directivity pattern of the horizontally polarized wave and the directivity pattern of the vertically polarized wave when a radio wave was radiated from the patch antenna element 12 were obtained through simulation.

In FIG. 7A, the AMC 6 was assumed to be disposed on a ground surface G extending in parallel to an X-Y plane and to an infinite extent.

A width dimension W of the sides parallel to the Y-direction of the AMC 6 was set to 50 mm. As for the distance L of the sides parallel to the X-direction of the AMC 6, five values were set by moving the position of the outer edge 6*b* along the X-direction. With respect to the distance L, five values were set in a range of about 10 mm to 50 mm, and verification was performed for each of the values.

The center position in the Y-direction of the antenna substrate 10 (patch antenna element 12) matches the center position in the Y-direction of the AMC 6.

Figure 7B:
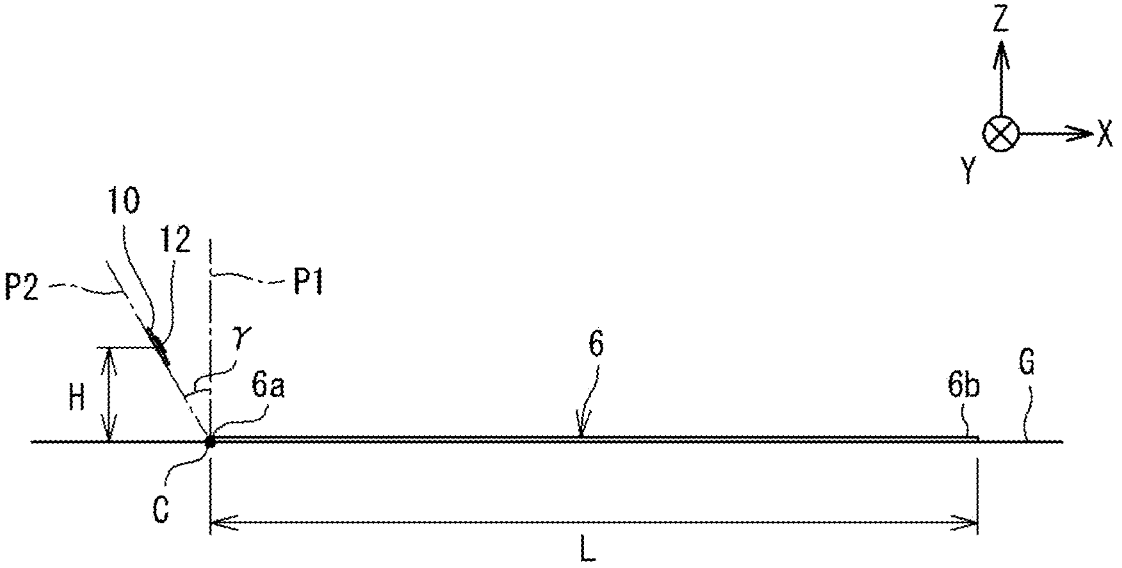
FIG. 7B shows the model used in the verification test viewed along a Y-direction.

FIG. 7B shows the model used in the verification test viewed along the Y-direction.

As shown in FIG. 7B, the antenna substrate 10 is arranged above the ground surface G, in a state of being inclined with respect to the Z-direction. The antenna substrate 10 is arranged along a straight line P2 inclined by an angle γ with respect to a straight line P1. The straight line P1 and the straight line P2 pass a point C on the ground surface G. The point C matches the base end 6*a* of the AMC 6. In the present test, the point C where the ground surface G and the straight line P2 cross each other was used as the base end of the antenna substrate 10. The straight line P1 was parallel to the Z-direction. The angle γ was set to 30 degrees. That is, the elevation in the radiation direction of the patch antenna element 12 was set to 30 degrees. A height H from the ground surface G to the center in the Z-direction of the patch antenna element 12 was set to 8.1 mm.

The shape of the patch antenna element 12 was set to a square of which one side was 2.5 mm.

The frequency of the radio wave radiated from the patch antenna element 12 was set to 28 GHz.

Figure 8:
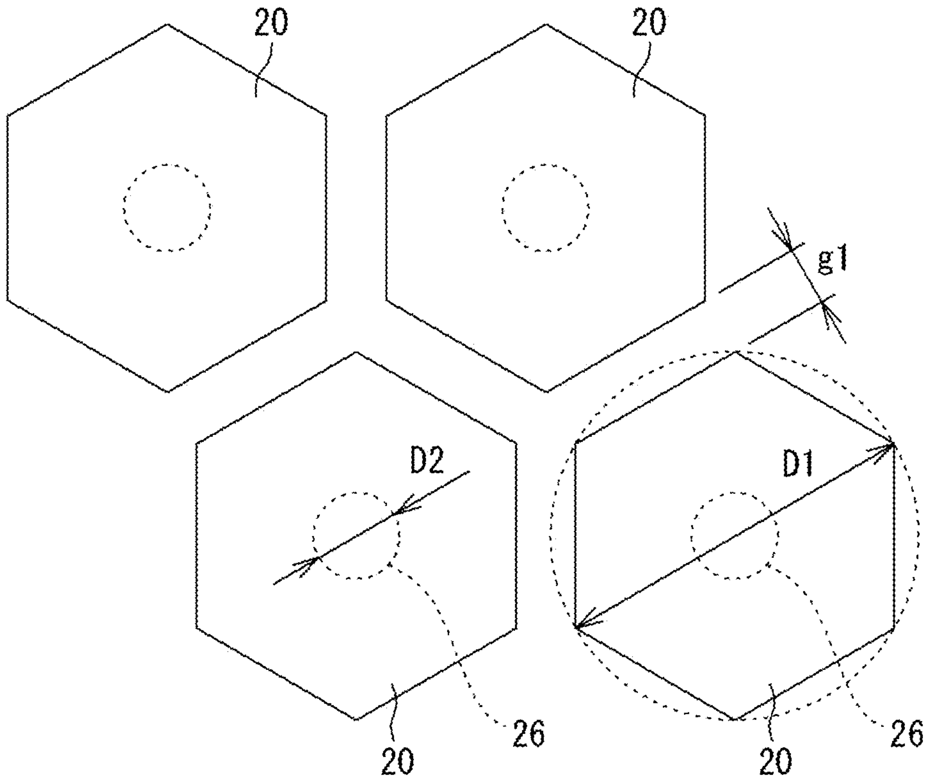
FIG. 8 is an enlarged view of the upper surface of the artificial magnetic conductor.

FIG. 8 is an enlarged view of the first surface 6*c* of the AMC 6.

The specific frequency band of the AMC 6 used in the model was set to a frequency band including 28 GHz.

More specifically, a diameter D1 of the circumcircle of the first unit cell 20 of the AMC 6 was set to 1.65 mm, the gap g1 was set to 0.2 mm, and a diameter D2 of the first via 26 was set to 0.3 mm.

The relative dielectric constant εr of the first dielectric layer 24 of the AMC 6 was set to 3.7, the dielectric loss tangent was set to 0.005, and the thickness t1 of the first dielectric layer 24 was set to 0.5 mm.

The thicknesses of the first unit cell 20 and the first ground conductor layer 22 were set to 30 μm.

Figure 9:
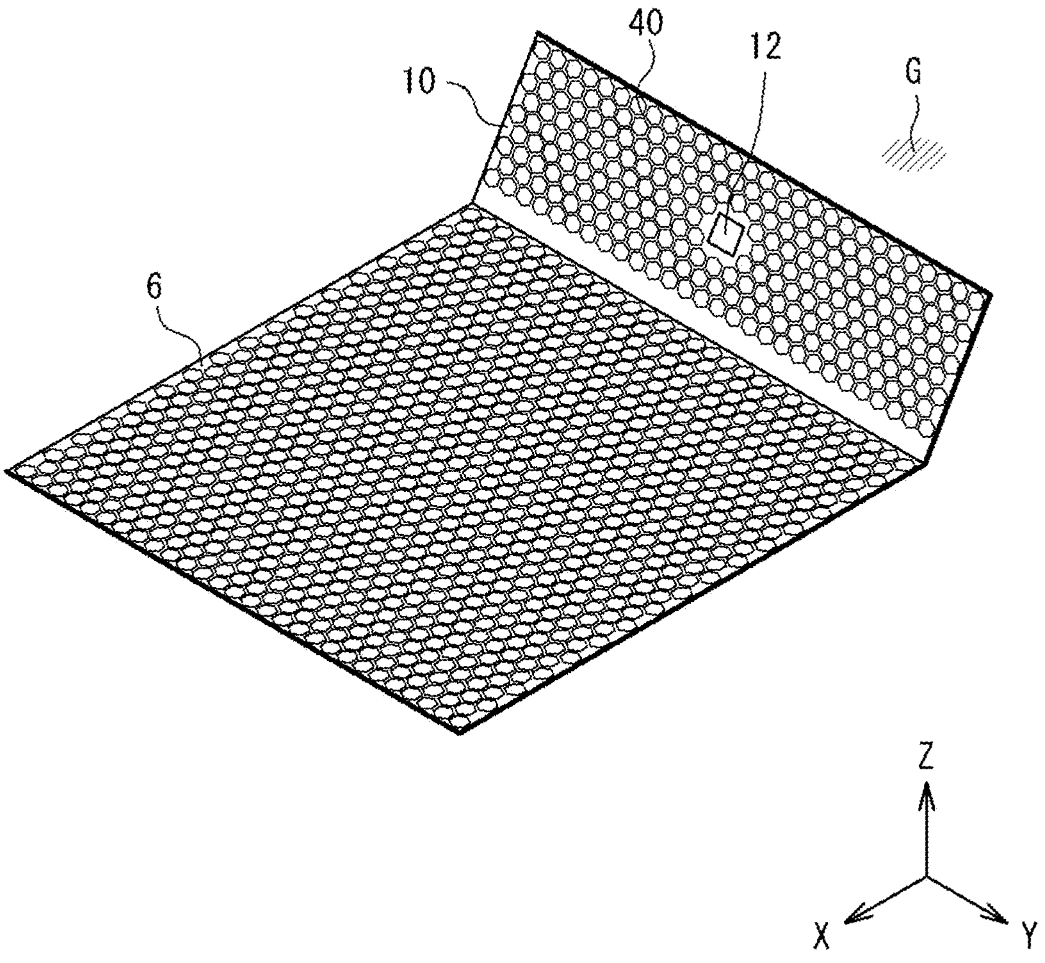
FIG. 9 is a perspective view showing a model provided with an electromagnetic band gap structure.

Further, as shown in FIG. 9, a model in which the EBG structure 40 was provided in the periphery of the patch antenna element 12 was also used.

In the model shown in FIG. 9, settings other than the provision of the EBG structure 40 in the periphery of the patch antenna element 12 were the same as those in the model described above. The shielding band of the EBG structure 40 was set to a band including 28 GHz, and the settings of the second unit cell and the second via of the EBG structure 40, the second dielectric layer, and the like were set to be the same as those of the AMC 6.

Using the models above, the directivity pattern was obtained with respect to six Examples and one Comparative Example shown below.

Example 1: seven rows of the first unit cells 20 were arranged from the base end 6*a* in the X-direction. In this case, the distance L was 10.1 mm (the ratio P: 0.94).

Example 2: nine rows of the first unit cells 20 were arranged from the base end 6*a* in the X-direction. In this case, the distance L was 12.9 mm (the ratio P: 1.2).

Example 3: 11 rows of the first unit cells 20 were arranged from the base end 6*a* in the X-direction. In this case, the distance L was 15.8 mm (the ratio P: 1.48).

Example 4: 13 rows of the first unit cells 20 were arranged from the base end 6*a* in the X-direction. In this case, the distance L was 18.6 mm (the ratio P: 1.73).

Example 5: 33 rows of the first unit cells 20 were arranged from the base end 6*a* in the X-direction. In this case, the distance L was 47.4 mm (the ratio P: 4.43).

Example 6: 33 rows of the first unit cells 20 were arranged from the base end 6*a* in the X-direction. In this case, the distance L was 47.4 mm (the ratio P: 4.43). In addition, the EBG structure 40 was provided in the periphery of the patch antenna element 12.

Comparative Example: no AMC 6 was arranged.

Figure 10:
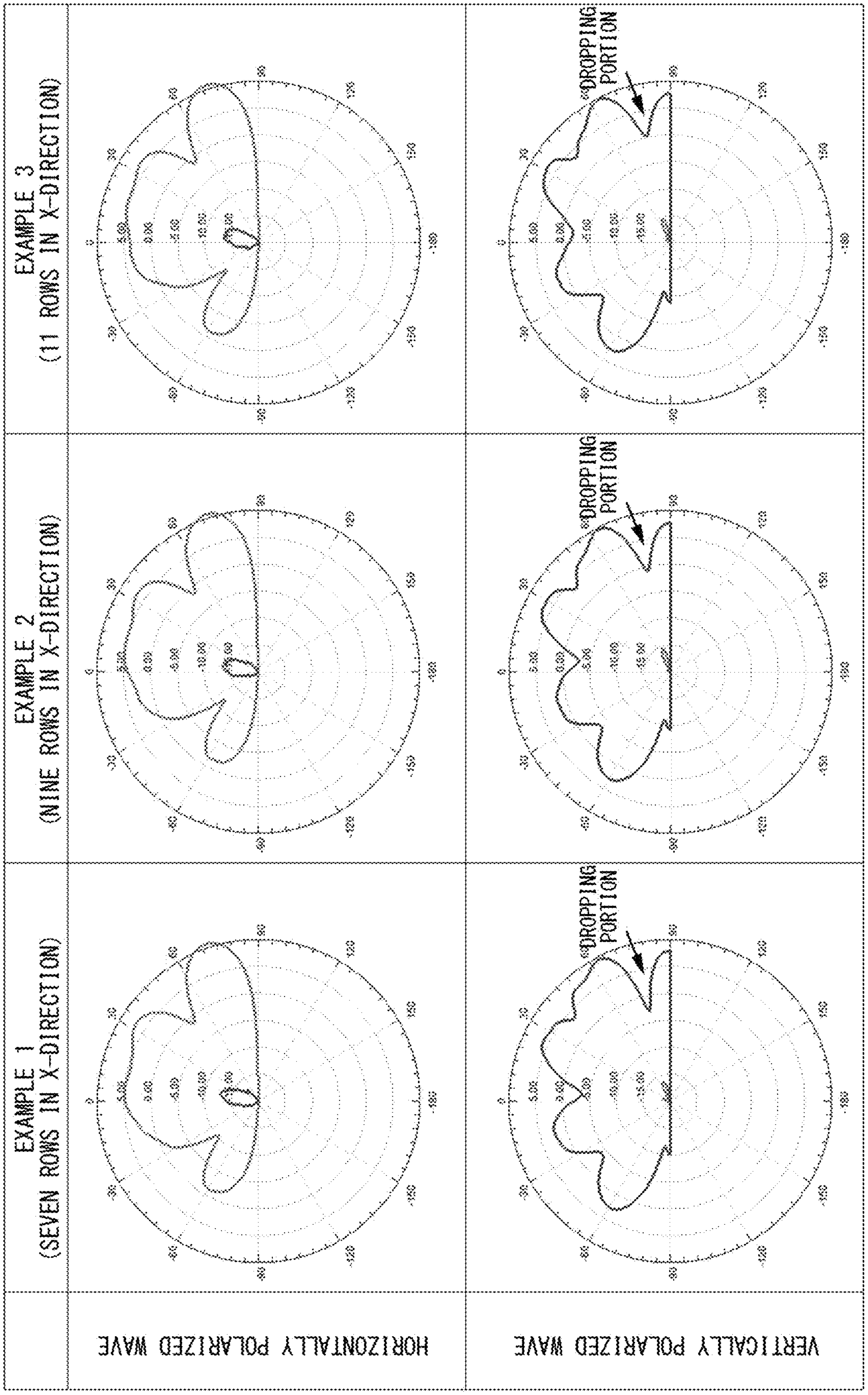
FIG. 10 shows directivity patterns in Example 1, Example 2, and Example 3.

FIG. 10 shows the directivity patterns in Example 1, Example 2, and Example 3.

Figure 11:
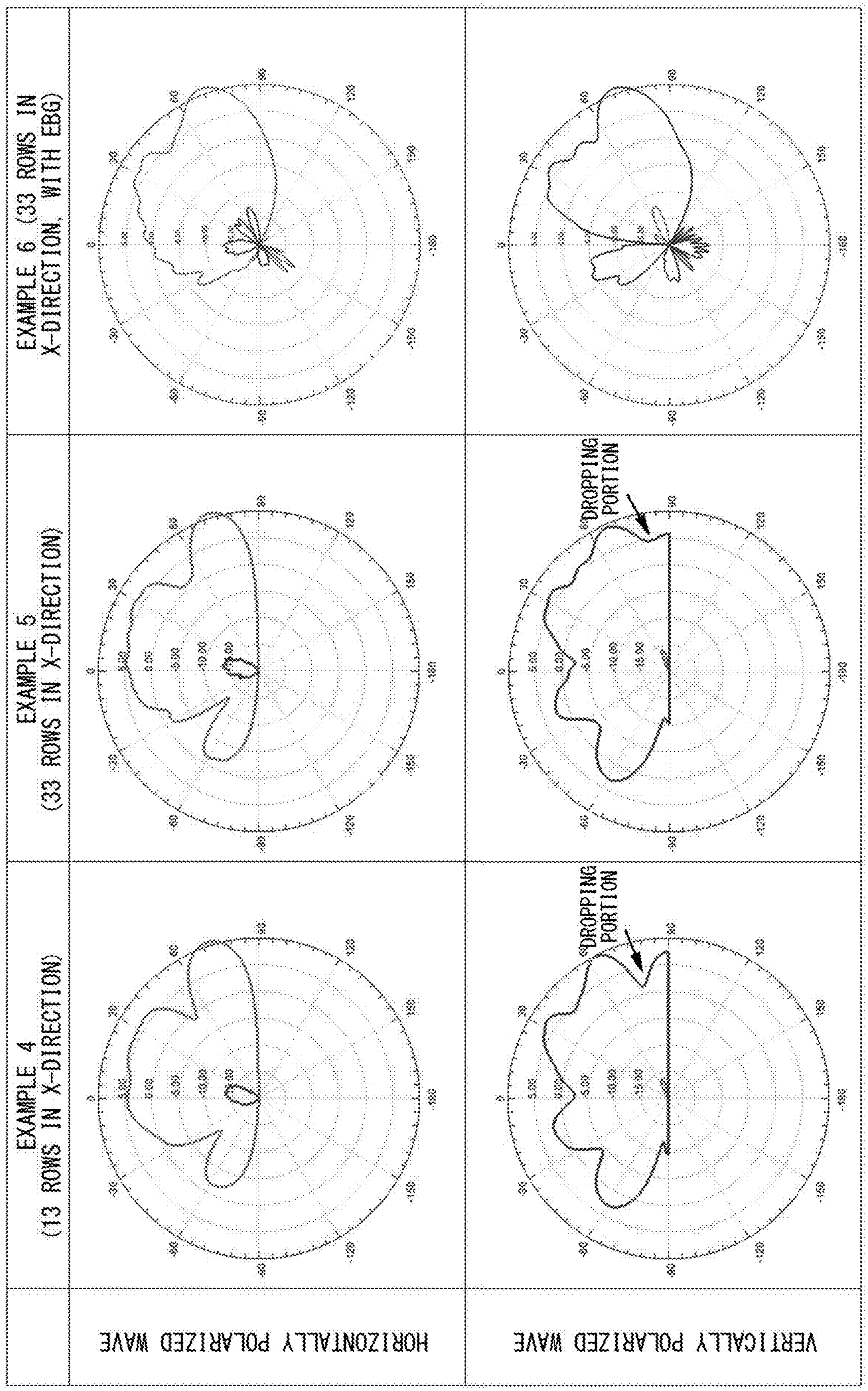
FIG. 11 shows directivity patterns in Example 4, Example 5, and Example 6.

FIG. 11 shows the directivity patterns in Example 4, Example 5, and Example 6.

Figure 12:
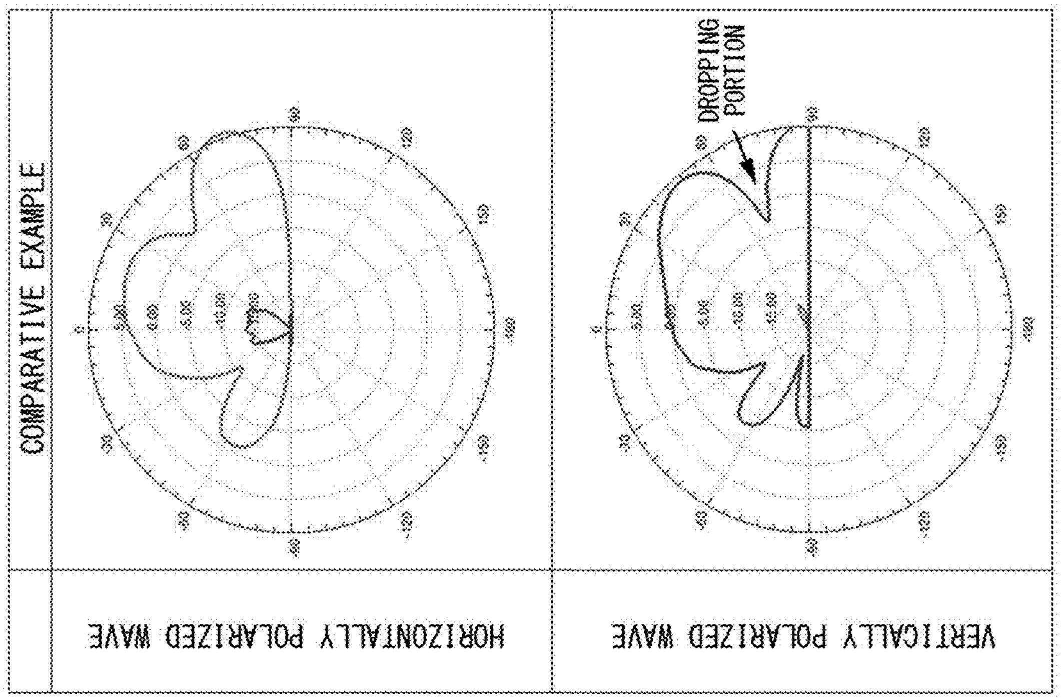
FIG. 12 shows a directivity pattern in Comparative Example.

FIG. 12 shows the directivity pattern in Comparative Example.

In FIG. 10, FIG. 11, and FIG. 12, in the directivity pattern of the horizontally polarized wave, the direction at 0 degrees is the X-direction (in FIG. 7, the direction indicated by the arrow in the X-direction), and the direction of 90 degrees and −90 degrees is the Y-direction.

In FIG. 10, FIG. 11, and FIG. 12, the directivity pattern of the vertically polarized wave shows the directivity pattern in an X-Z plane passing the center of the radiation surface of the patch antenna element 12. That is, this directivity pattern of the vertically polarized wave shows the directivity pattern of the vertically polarized wave in the radiation direction. In this directivity pattern of the vertically polarized wave, the direction at 0 degrees is the Z-direction (in FIG. 7, the direction indicated by the arrow in the Z-direction) and the direction at 90 degrees is the X-direction (in FIG. 7, the direction indicated by the arrow in the X-direction).

With reference to the directivity pattern (FIG. 12) of the vertically polarized wave in Comparative Example, the maximum gain was realized in the vicinity of an angle of about 60 degrees. This is because the elevation of the patch antenna element 12 was set to 30 degrees.

It is seen that, in the directivity pattern of the vertically polarized wave in FIG. 12, a dropping portion (null) occurred in a part where the elevation is lower than that in the part of the maximum gain. The dropping portion denotes the part where the gain has significantly decreased irrespective of being in the vicinity of the part of the maximum gain.

In each of the directivity patterns (FIG. 10, FIG. 11) of the vertically polarized wave in Example 1 to Example 5, the maximum gain was realized in the vicinity of an angle of 60 degrees (an angle corresponding to an elevation of about 30 degrees in the radiation direction).

In the dropping portion in the directivity pattern of the vertically polarized wave in each of Example 1 to Example 5, the degree of drop is smaller than that of the dropping portion of Comparative Example, which is an improvement. In Example 2 to Example 5, significant improvement is observed.

In accordance with increase in the distance L (in accordance with increase in the number of rows), the degree of drop of the dropping portion becomes smaller. In particular, the dropping portion in Example 5 has only dropped slightly, and it is seen that there is no large difference from the part of the maximum gain.

With respect to the directivity patterns of the horizontally polarized wave in Example 1 to Example 5 and the directivity pattern of the horizontally polarized wave in Comparative Example, there is no large difference thereamong.

From these results, it is seen that partial drop occurring in the directivity pattern of the vertically polarized wave at the antenna can be suppressed through the provision of the AMC 6.

In addition, it is seen that, when the ratio P of the distance L is set to 1 or greater, the degree of drop of the dropping portion is improved.

The directivity pattern of the vertically polarized wave in Example 5 and the directivity pattern of the vertically polarized wave in Example 6 were compared with each other.

As a result, in the directivity pattern of the vertically polarized wave in Example 5, a slight dropping portion is observed, whereas, in the directivity pattern of the vertically polarized wave in Example 6, hardly any dropping portion is observed.

From this, it is seen that, when the EBG structure 40 is arranged in the periphery of the patch antenna element 12, partial drop occurring in the directivity pattern of the vertically polarized wave can be further effectively suppressed.

In Example 6, only the surface on which the AMC 6 included in the model was placed and that was in contact with the AMC 6 was used as the ground surface G, and the periphery of the AMC 6 was set to be a space. Therefore, sneaking of the gain occurred on the lower surface side of the AMC 6. Therefore, between the pattern in Example 5 and the pattern in Example 6, a difference is observed in the shape on the lower side of the ground surface G. However, it has been confirmed that, also in a case where the model of Example 6 was placed on the ground surface G extending to an infinite extent as in Example 5, a similar result was obtained.

[Others]

The disclosed embodiments are illustrative in all aspects and should not be recognized as being restrictive.

The scope of the present disclosure is defined by the scope of the claims rather than by the description above, and is intended to include meaning equivalent to the scope of the claims and all modifications within the scope.

REFERENCE SIGNS LIST

1 antenna module
2 base substrate
4 antenna
**4*a*** base end
6 artificial magnetic conductor
**6*a*** base end
**6*b*** outer edge (outer end)
**6*c*** first surface
10 antenna substrate
**10*a*** base end
**10*b*** antenna surface
12 patch antenna element
**12*a*** radiation surface
16 bent portion
20 first unit cell
22 first ground conductor layer
24 first dielectric layer
**24*a*** upper surface
**24*b*** lower surface
26 first via
30 second ground conductor layer
32 second dielectric layer
**32*a*** second surface
**32*b*** third surface
40 electromagnetic band gap structure
42 second unit cell
44 second via
46 non-arrangement region
50 substrate
**50*a*** upper surface
100 antenna
102 roof surface
104 patch antenna element
B imaginary perpendicular line
D1 diameter
D2 diameter
G ground surface
H height
L distance
P1 straight line
P2 straight line
R roof
S center
W width dimension
g1 gap
g2 gap
t1 thickness
t2 thickness
γ angle
θ angle

The invention claimed is:

1. An antenna module comprising:
a base substrate mounted to a mount surface;
an antenna mounted to the mount surface proximate to the base substrate; and
a conductor member having a plate shape and arranged so as to be adjacent to the antenna, the conductor member having a first surface on which a plurality of first unit cells made of a conductor are regularly arrayed, wherein
the conductor member has a base end adjacent to the antenna,
the first surface extends from the base end along the mount surface,
when the first surface is viewed in a plan view, an imaginary perpendicular line extending from a radiation surface of the antenna overlaps the first surface in the plan view, and
an angle of the imaginary perpendicular line with respect to the mount surface is from 15 to 50 degrees.

2. The antenna module according to claim 1, wherein
the conductor member includes:
a ground conductor layer; and
a first dielectric layer present between the plurality of first unit cells and the ground conductor layer, and
an electrical length between a boundary between the plurality of first unit cells and the first dielectric layer, and a boundary between the ground conductor layer and the first dielectric layer is 0.03 or greater.

3. The antenna module according to claim 1, wherein
the conductor member has an outer end on a side opposite to the base end,
the first surface extends from the base end to the outer end, and
a ratio of a distance from the base end to the outer end relative to a vacuum wavelength of a radio wave radiated from the antenna is 1 or greater.

4. The antenna module according to claim 1, wherein
the conductor member has an outer end on a side opposite to the base end,
the first surface extends from the base end to the outer end, and
a distance from the base end to the outer end is 10.7 mm or more.

5. The antenna module according to claim 1, wherein the antenna includes one or a plurality of patch antenna elements, and when the first surface is viewed in the plan view, the imaginary perpendicular line extending from the radiation surface of the one or the plurality of patch antenna elements overlaps the first surface in the plan view.

6. The antenna module according to claim 5, wherein the antenna further includes:

a ground conductor layer;

a second dielectric layer present between the one or the plurality of patch antenna elements and the ground conductor layer; and an electromagnetic band gap structure provided so as to surround a periphery of the one or the plurality of patch antenna elements.

7. The antenna module according to claim 1, wherein a frequency of a radio wave transmitted and received by the antenna is 20 GHz or higher.

8. The antenna module according to claim 1, wherein the mount surface is a roof surface of a vehicle.

9. A vehicle comprising:

a vehicle body;

an antenna mounted to an upper surface of the vehicle body; and a conductor member having a plate shape and mounted to the upper surface so as to be adjacent to the antenna, the conductor member having a first surface on which a plurality of first unit cells made of a conductor are regularly arrayed, wherein the conductor member has a base end adjacent to the antenna, the first surface extends from the base end along the upper surface, when the first surface is viewed in a plan view, an imaginary perpendicular line extending from a radiation surface of the antenna overlaps the first surface in the plan view, and an angle of the imaginary perpendicular line with respect to the upper surface is from 15 to 50 degrees.

10. The vehicle according to claim 9, wherein the conductor member is a body separate from the antenna.

11. The antenna module according to claim 1, wherein the conductor member includes an artificial magnetic conductor.

* * * * *